United States Patent [19]

Akitake

[11] Patent Number: 4,958,177
[45] Date of Patent: Sep. 18, 1990

[54] ROTATIONAL DRIVE MECHANISM
[75] Inventor: Horoshi Akitake, Hachiojo, Japan
[73] Assignee: Olympus Optical Co., Ltd., Japan
[21] Appl. No.: 257,508
[22] Filed: Oct. 13, 1988
[30] Foreign Application Priority Data
  Oct. 15, 1987 [JP] Japan .................................. 62-260891
  Nov. 30, 1987 [JP] Japan .................................. 62-301968
[51] Int. Cl.$^5$ .............................................. G03B 1/18
[52] U.S. Cl. .................................. 354/195.1; 354/400;
  354/402; 354/435; 74/665 GA
[58] Field of Search .................. 354/195.1, 173.1, 214,
  354/400, 402, 435; 74/665 GA, 665 Q, 665 P
[56] References Cited
U.S. PATENT DOCUMENTS
  4,724,450 2/1988 Miyawaki et al. ............... 354/173.1
  4,728,979 3/1988 Akitake et al. ...................... 354/400

Primary Examiner—Brian W. Brown
Attorney, Agent, or Firm—Louis Weinstein

[57] ABSTRACT

A rotational drive mechanism includes a differential gearing assembly having a pair of output gears, to which a pair of mechanisms are connected. Rotation of the gears in the respective mechanisms is changed depending on the magnitude of respective loads. The first mechanism includes a gear (such as an AE gear of an exposure control mechanism) which is prevented form rotating by an engagement with a displacement member when the latter returns from its overcharged position to its attracted position. Thereupon, a gear in the second mechanism (such as an AF gear in a focus controlling mechanism) is enabled for rotation in either direction.

33 Claims, 10 Drawing Sheets

ROTATIONAL DRIVE MECHANISM

FIELD OF THE INVENTION AND RELATED ART STATEMENT

The invention relates to a rotational drive mechanism, and more particularly, to a rotational drive mechanism which transmits power from a drive source The present applicant has previously proposed an apparatus for controlling exposure and focus of a camera in Japanese Laid-Open Patent Application No. 23,138/1978 in which a drive source is connected with a pair of loads through a differential gearing so that the particular load driven from the source may be selected depending on the relative magnitudes of the two loads. Also disclosed in Japanese Laid-Open Patent Application No. 132,652/1978 is an apparatus for controlling exposure and focus of a camera in which a one-way clutch and a planetary gearing are used to selectively drive a pair of loads by switching between the directions of rotation of the drive source.

In either arrangement described above, a drive occurs only in one direction for positioning when a focus controlling operation takes place, and hence a reset operation has been required after the completion of an exposure process in order to return a focus controlling member to its initial position. Accordingly, the focus controlling member must be returned to its reset position and then driven again after each photographing operation if the distance to an object or objects being photographed do not significantly change in a series of consecutive photographing operations, thus resulting in a loss in the time involved.

Accordingly, it has been impossible in such an arrangement to implement a distance measuring scheme, commonly referred to as a continuous AF process, which is designed to drive a focus controlling member to bring it into focus with a prevailing object being photographed, by conducting a distance measurement at a given time interval as desired as long as a release button is being depressed.

SUMMARY OF THE INVENTION

It is an object of the invention to provide a rotational drive mechanism in which a pair of loads, which are not limited to an exposure or focus controlling device, which are connected to a differential gearing can be selectively driven and in which one of the loads can be driven in both directions to avoid a loss in time in the operational sequence.

It is another object of the invention to provide an exposure/focus controlling apparatus in which a single drive source is employed while enabling switching between a focus controlling operation and an exposure controlling operation depending on the relative magnitudes of the pair of loads and in which one of the loads, namely, a focus controlling mechanism, is made to be driven in both directions to avoid a loss in time until a focus controlling operation can be started after the completion of an exposure operation.

The above object is accomplished in accordance with the invention by a rotational drive mechanism comprising a differential gearing having a pair of output gears, and which is arranged such that an output gear associated with a smaller load can rotate when the gearing is driven from a rotational drive source. One of the output gears of the differential gearing is connected to a first mechanism which is designed for rotation in one direction with a given magnitude of drive while the other output gear is connected to a second mechanism which requires a varying magnitude of drive during its rotation in both directions and which is associated with a greater load than the first mechanism or which is prevented from movement while the first mechanism is being driven.

A displacement member is disposed relative to an electromagnetic solenoid for displacement among a plurality of positions including a position where it is urged away from the solenoid, another position in which it is held attracted by the solenoid, and an overcharge position where it is further driven beyond the attracted position so as to be held pressed against the solenoid. The first mechanism which is connected to one of the output gears of the differential gearing includes a rotational gear having an engaging element disposed in opposing relationship with the displacement member. When the displacement member is driven by charging means to pass through the overcharge position where it is firmly pressed against the solenoid and reaches the attracted position, the displacement member engages the engaging element of the rotational gear to block the rotation of the rotational gear, whereupon a gear on the second mechanism is enabled for rotation in either direction. The engagement between the rotational gear and the displacement member is terminated in response to a movement of the displacement member away from the solenoid as it is deenergized, whereupon the second mechanism comes to a stop.

In a specific arrangement of the invention, one of the output gears of the differential gearing is connected to an exposure controlling mechanism while the other output gear is connected to a focus controlling mechanism representing a greater load than the exposure controlling mechanism. The exposure controlling mechanism includes an AE gear which is formed with a driving cam groove for angularly driving a sector opening and closing lever. A displacement member is associated with an electromagnetic solenoid and is usually urged away therefrom. The displacement member carries a flucrum of the lever, and when the displacement member is held attracted by the solenoid, the lever is angularly driven in accordance with the driving cam groove to open sectors, which are closed when the displacement member assumes a position where it is removed from the solenoid. An engaging groove is formed to extend radially of the AE gear at a position of the driving cam groove where the sectors are closed, and a follower pin on the lever is fitted into the engaging groove when the displacement member assumes its attracted position, thereby blocking the AE gear against rotation while enabling the focus control mechanism for rotation in either direction. When the displacement member is displaced to its normally urged position, the pin retracts to enable a rotation of the AE gear.

In accordance with the invention, a simple mechanism allows a pair of loads, one exhibiting a constant stroke and the other having a variable stroke in either direction, to be selectively driven from a single drive source. In accordance with the invention, a switching between the focus and the exposure controlling operation can be achieved with a simple mechanism, depending on the relative magnitudes of the pair of loads. Since the focus controlling mechanism, which represents one of the loads, can be driven in both directions, a loss in time until the focus controlling operation is enabled is

DETAILED DESCRIPTION OF PREFERRED EMBODIMENTS

Figure 1:
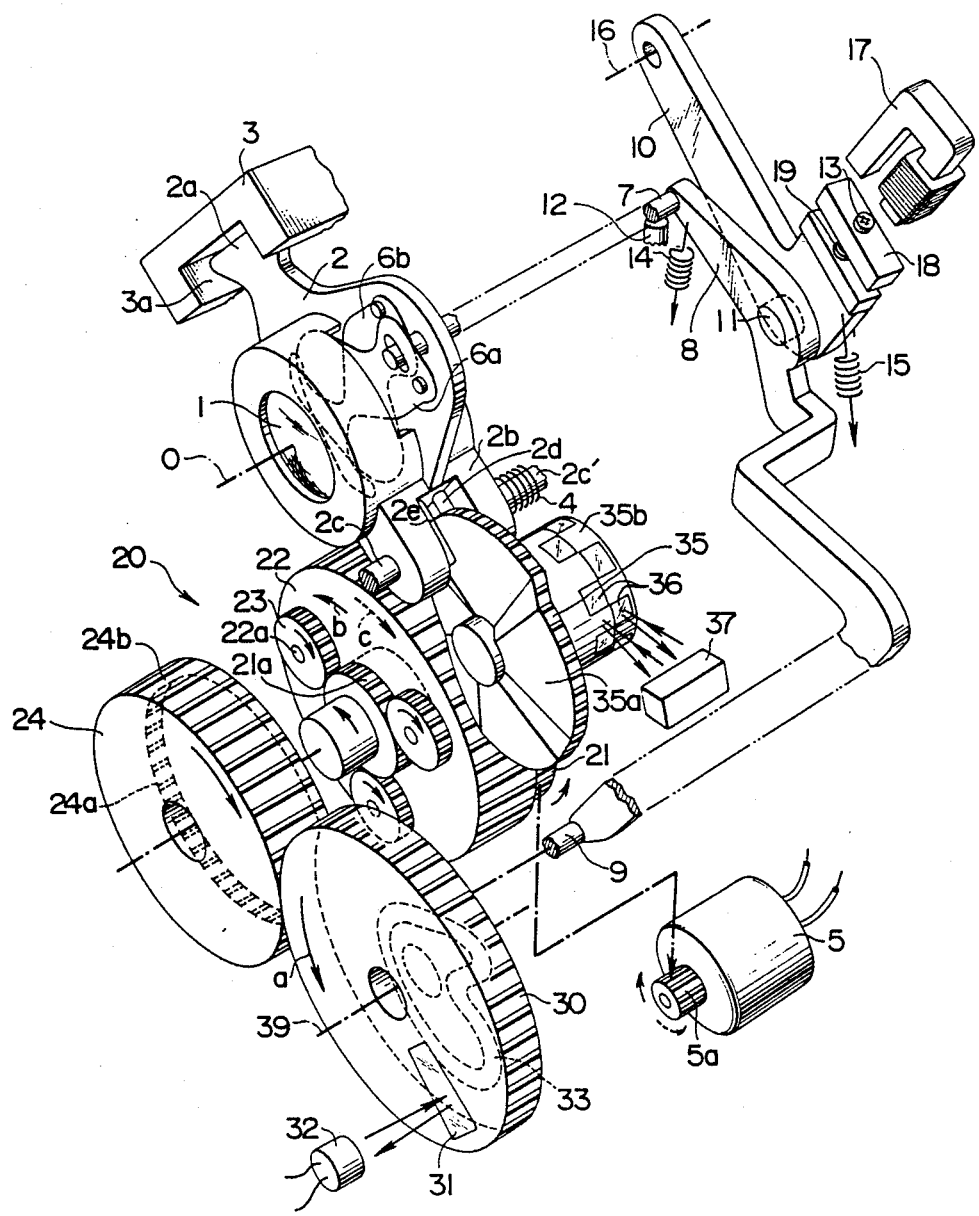
FIG. 1 is a perspective view of a rotational drive mechanism according to a first embodiment of the invention.

FIG. 1 shows a first embodiment of the invention as applied to an exposure/focus controlling apparatus of a camera in which a taking lens 1 is held in position within a lens barrel 2 by a holder sleeve. In order to permit movement of the lens barrel 2 along an optical axis 0 of the taking lens 1 from a nearest focal position of the lens 1 to an infinity position, one end of the lens barrel 2 is formed with an ear 2a which fits in a guide groove 3a defined in a rotational stop 3 which is in turn mounted on a stationary member such as a camera body. At its other end, the lens barrel 2 is formed with a forked member 2b carrying a pair of guide pins 2c, 2c' which extend parallel to the optical axis 0 and which slidably fit in guide openings formed in a stationary member, not shown. In this manner, the lens barrel 2 serves to guide the taking lens 1 for movement in the direction of the optical axis. Additionally, the barrel 2 is provided with a pair of sectors 6a, 6b, which define a shutter of vario type and having an opening in which a sector opening and closing pin 7 is fitted to achieve an opening and closing movement of the sectors. A stop 12 is disposed below the pin 7 to limit the location of the pin 7. It is to be understood that a fully open position and a fully closed position of the sectors 6a, 6b are defined by stops, not shown. The pin 7 is fixedly mounted on the free end of one arm of an opening and closing lever 8, the other arm of which has a downwardly folded configuration, fixedly carrying an automatic exposure (hereafter abbreviated as AE) drive pin 9 on the free end thereof. The lever 8 has a fulcrum intermediate its length, which is defined by a shaft 11, around which the lever 8 is rotatably mounted and which is fixedly connected to a bend of a support arm 10 which is in turn rotatably mounted on a shaft 16 at its one end. The lever 8 is normally urged to rotate counterclockwise about the fulcrum or the shaft 11 by a spring 14 which is engaged with its one arm. The support arm 10 is also normally urged to rotate clockwise about the shaft 16 by a spring 15 which is engaged therewith adjacent to its free end. An armature 18 which is adapted to be held attracted by an electromagnetic solenoid 17 is mounted on the free end of the support arm 10 by a locking screw 13 with a spring 19 interposed therebetween.

A motor 5 constitutes a drive source for achieving an exposure/focus controlling operation of a camera. Specifically, rotational drive from the motor 5 is transmitted to a differential gearing 20. The construction of the motor 5 and the differential gearing 20 is also similar in a second embodiment to be described later, and will now be described with reference to FIG. 3, which illustrates an exploded view thereof. Specifically, a drive gear 5a is fixedly mounted on the output shaft of the motor 5 and meshes with a sun gear 21 of an increased diameter, the boss of which is integrally formed with a gear 21a of a reduced diameter. A carrier gear or carrier of an increased diameter 22 is rotatably disposed around the boss of the sun gear. The gear 21a is disposed to project on the front side of the carrier 2 for meshing engagement with three planet gears 23 rotatably mounted on three support shafts 22a which are in turn fixedly mounted on the front surface of the carrier 22 at equal angular intervals. These planet gears 23 mesh with internal teeth 24a of an internal gear 24.

Considering the operation of tee differential gearing 20, the rotation of the sun gear 21 is transmitted to the planet gears 23 through the gear 21a. When the carrier 22 is constrained from rotating, the support shaft 22a also remain immovable, but the planet gears 23 rotate about the respective shafts 22a, whereby the internal gear 24 rotates. On the other hand, when the internal gear 24 is constrained from rotating, the planet gears 23 revolve about the gear 21a, which then function as a sun gear, around the internal teeth 24a of the internal gear 24 while rotating themselves about the respective shafts 22a. Accordingly, the support shafts 22a also move as a result of the movement of the planet gears 23, resulting in a rotation of the carrier 22.

Figure 2A:
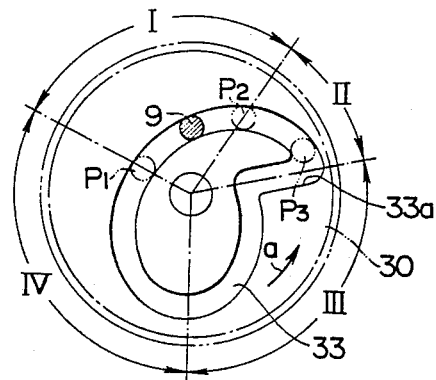
FIGS. 2A to 2C are schematic views illustrating different operational phases obtained by the relationship between a AE cam groove formed in an AE gear and a drive pin shown in FIG. 1.
Figure 2B:
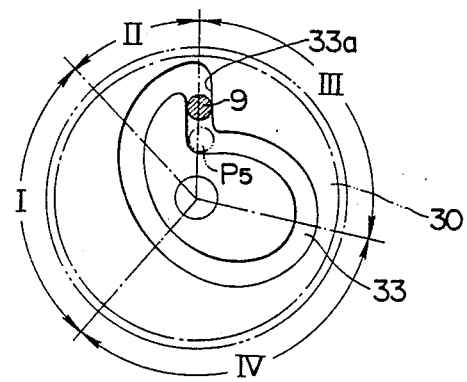
Figure 2C:
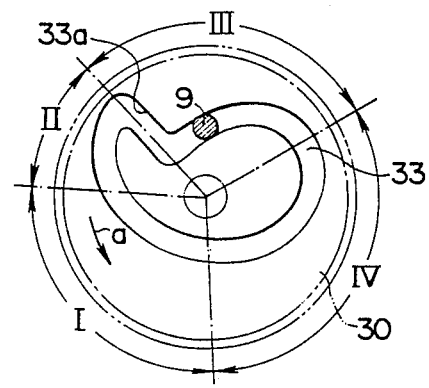

Returning to FIG. 1, external teeth 24b are formed around the outer periphery of the internal gear 24 and mesh with an AE gear 30 which is disposed for rotation about its support shaft 39. The AE gear 30 is formed with an AE cam groove 33 in the form of a closed loop including regions I to IV shown in FIG. 2A and in which the AE drive pin 9 fits as a cam follower Referring to FIGS. 2A to 2C, a detent area 33a defined by a radially extending, linear cam groove, is defined between the regions II and III of the cam groove 33 It is to be understood that the AE cam groove 33 as shown FIGS. 2A to 2C is depicted as a pattern when viewed from the front side of a camera. On its front surface, the AE gear 30 is formed with a reflective pattern 31 which is used to define an initial position, and a photo-reflector 32 is mounted on a stationary member, not shown, in opposing relationship with the reflective pattern 31.

The carrier 22 is in meshing engagement with an AF gear 35, part of which is held between projections 2d and 2e formed on the insides of the forked member 2b of the lens barrel 2. On its opposite lateral sides, the AF gear 35 is formed with an AF cam 35a including four steps in order to control the distance to an object being photographed from a first to a fourth step. A spring 4 urges the projection 2d on the forked member 2b of the lens barrel 2 against the AF gear 35, whereby during the rotation of the AF gear 35, the lens barrel 2 is driven in the direction of the optical axis by means of the AF cam 35a for purpose of focus adjustment. The AF gear 35 has a boss 35b around which a suitable number of reflective patterns 36 are formed over the entire perimeter of the boss 35b in order to allow a rotational position and the direction of rotation of the AF gear 35 to be detected in association with a rotation detector 37 comprising a photo-reflector which is disposed in opposing relationship with the reflective pattern 36.

In operation, when the motor 5 begins its rotation in the forward direction, the drive gear 5a rotates forwardly, or in a direction indicated by a solid line arrow, whereby the sun gear 21 rotates in one direction. The resulting rotation of the sun gear 21 is transmitted to the internal teeth 24a of the internal gear 24 through the gear 21a and the planet gears 23. At this time, a load on the carrier 22, namely, the AF gear 35 carrying the AF cam 35a and the lens barrel 2 carrying the taking lens 1 of the focus controlling mechanism is far greater than the load on the internal gear 24, namely, the AE gear 30, and accordingly the carrier 22, representing one of the output gears of the differential gearing 20, is prevented from rotating. As a result the rotation of the sun gear 21 and the gear 21a is entirely transmitted to the internal gear 24, which represents the other output gear of the differential gearing 20, and the resulting rotation of the internal gear 24 is transmitted to the AE gear 30.

When the AE gear 30 rotates in the direction of an arrow a, the AE drive pin 9 which is engaged with the AE cam groove 33 formed in the AE gear 30 moves from an initial position $P_1$ through the region I of the cam groove 33, as indicated in FIG. 2A. Since the pin 7 on the opening and closing lever 8 has its one end held in abutment against the stop 12, as the drive pin 9 moves through the region I in a direction away from the center of the cam groove 33, the lever 8 angularly moves counterclockwise, as viewed in FIG. 1, about the fulcrum defined by the pin 7. As a result, the support arm 10 also angularly moves in the same direction about its support shaft 16, causing the armature 18 to be urged against the solenoid 17.

The armature 18 abuts against the solenoid 17 when the drive pin 9 reaches its final position $P_2$ of the region I, but the spring 19 interposed between the support arm 10 and the armature 8 allows the drive pin 9 to move beyond the position $P_2$ to a position $P_3$ within the region II in response to a further rotation of the AE gear 30. As the drive pin 9 moves through the region II, the support arm 10 rotates counter-clockwise while tensioning (i.e. compressing) the spring 19, causing the armature 18 to be held pressed against the solenoid 17 by the resilience of the spring 19. In other words, an angular stroke of the support arm 10 which corresponds to a movement of the drive pin 9 from the position $P_2$ to the position $P_3$ within the region II represents an overcharge stroke which is beyond a stroke experienced when bringing the armature 18 to its attracted position.

The solenoid 17 is energized when the drive pin 9 is located within the region I or II, and accordingly, the solenoid 17 subsequently holds the armature 18 attracted thereto, thus holding the support arm 10. After the armature 18 becomes held attracted, as the drive pin 9 goes beyond the position $P_3$ in response to a further rotation of the AE gear 30, the drive pin 9 drops into the detent area 33a which extends radially to a point closer to the center of the AE gear 30 at the interface between the region II and the next following region III. Thereupon the resilience of the tensioned spring 19 is effective to drive the drive pin 9 through the overcharge stroke over the detent area 33a of the AE cam groove 33 immediately after the pin has moved past the position $P_3$, assuming a condition illustrated in FIG. 2B. It will be seen that the AE gear 30 is now locked by the drive pin 9 against rotation in either direction. In other words, the AE gear 30 is prevented from rotating in the direction of the arrow a obviously, and is also unable to rotate in the opposite direction from the direction of the arrow a if the motor 7 rotates in the reverse direction for purpose of focus control, as will be described later.

When the AE gear 30 is locked by the drive pin 9 against rotation in the manner mentioned above, the rotation of the internal gear 24 of the differential gearing 20 is inhibited, whereupon the planet gears 23 revolve to cause the carrier 22 to rotate. The rotation of the carrier 22 is transmitted to the AF gear 35 for performing a focus controlling operation. The motor 5 is then enabled for rotation in either forward or reverse direction. Assume now that the motor 5 rotates in the forward direction as mentioned. When the internal gear 24 is inhibited to rotate, the carrier 22 rotates in a direction indicated by a solid line arrow b. Conversely, when the motor 5 rotates in the reverse direction as indicated by a broken line arrow, the carrier 22 rotates in a direction indicated by a broken line arrow c. Thus, subsequent to the interruption of rotation of the internal gear 24, a rotational drive from the motor 5 in either direction is transmitted through the carrier 22 to the AF gear 35, which is then free to rotate in either forward or reverse direction. As mentioned previously, a rotation of the AF gear 35 causes the position of the lens barrel 2 to be stepwise controlled in accordance with the AF cam 35a. The direction of rotation and the rotational position of the AF gear 35 are detected by the rotation detector 37, and when an output from the detector 37 coincides with an output signal from a distance measuring unit, not shown, a focus control is completed, whereupon the motor 5 ceases to be driven.

An exposure process then follows. To initiate an exposure process, the solenoid 17 is deenergized once. The solenoid 17 releases the armature 18, whereby the support arm 10 rotates clockwise under the resilience of the spring 15, allowing the drive pin 9 to move out of the detent area 33a in the AE cam groove 33 to drop into a position $P_5$ shown in phantom line and which is closest to the center of rotation of the AE gear 30, defining the starting point of the region III. When the drive pin 9 drops to the position $P_5$, a constraint of the AE gear 30 against rotation in the direction of the arrow a is terminated. Accordingly, if the motor 5 rotates in a direction during the focus control which matches the forward direction when rotating the AE gear 30 in the direction of the arrow a, the internal gear 24 having a reduced load and the AE gear 30 are allowed to rotate when an output signal representing the rotational position of the AF gear 35 coincides with an output signal from the distance measuring unit, by merely interrupting the energization of the solenoid 17 without requiring the motor 5 to stop. Instead, the carrier 22 representing a higher load and the AF gear 35 cease to rotate, thus immediately initiating an exposure operation When the motor 5 rotates in the forward direction and the AE gear 30 rotates again in the direction of the arrow a to initiate the exposure process, the drive pin 9 moves from the position $P_5$ in a direction gradually moving away from the center of rotation of the AE gear 30 as shown in FIG. 2C. This causes the support arm 10 to be charged again, causing the armature 8 to be urged against and held attracted by the solenoid 17 which is then energized. Under this condition, the support arm 10 is maintained in its charged position Accordingly, when the AE gear 30 further rotates, the drive pin 9 then moves toward the center of rotation of the AE gear 30 gradually through the region IV which is contiguous with the region III. This causes the opening and closing lever 8 to rotate clockwise, as viewed in FIG. 1, allowing the pin 7 to open the sectors 6a, 6b. The sectors 6a, 6b then begin to be opened, and immediately before an exposure is actually initiated, the photoreflector 32 detects reflection of light from the pattern 31 to deliver a signal to a photometric circuit and an associated control circuit, not shown. When a proper exposure is achieved, the solenoid 17 is deenergized, whereupon the support arm 10 rotates clockwise. This rotates the opening and closing lever 8 counter-clockwise, closing the sectors 6a, 6b to complete the exposure process.

Thus it will be seen that according to the first embodiment, there is provided an exposure/focus controlling apparatus in which a focus controlling member is enabled to be driven in either direction with a simple arrangement and with a simple controlling operation and without requiring a reset operation.

Figure 3:
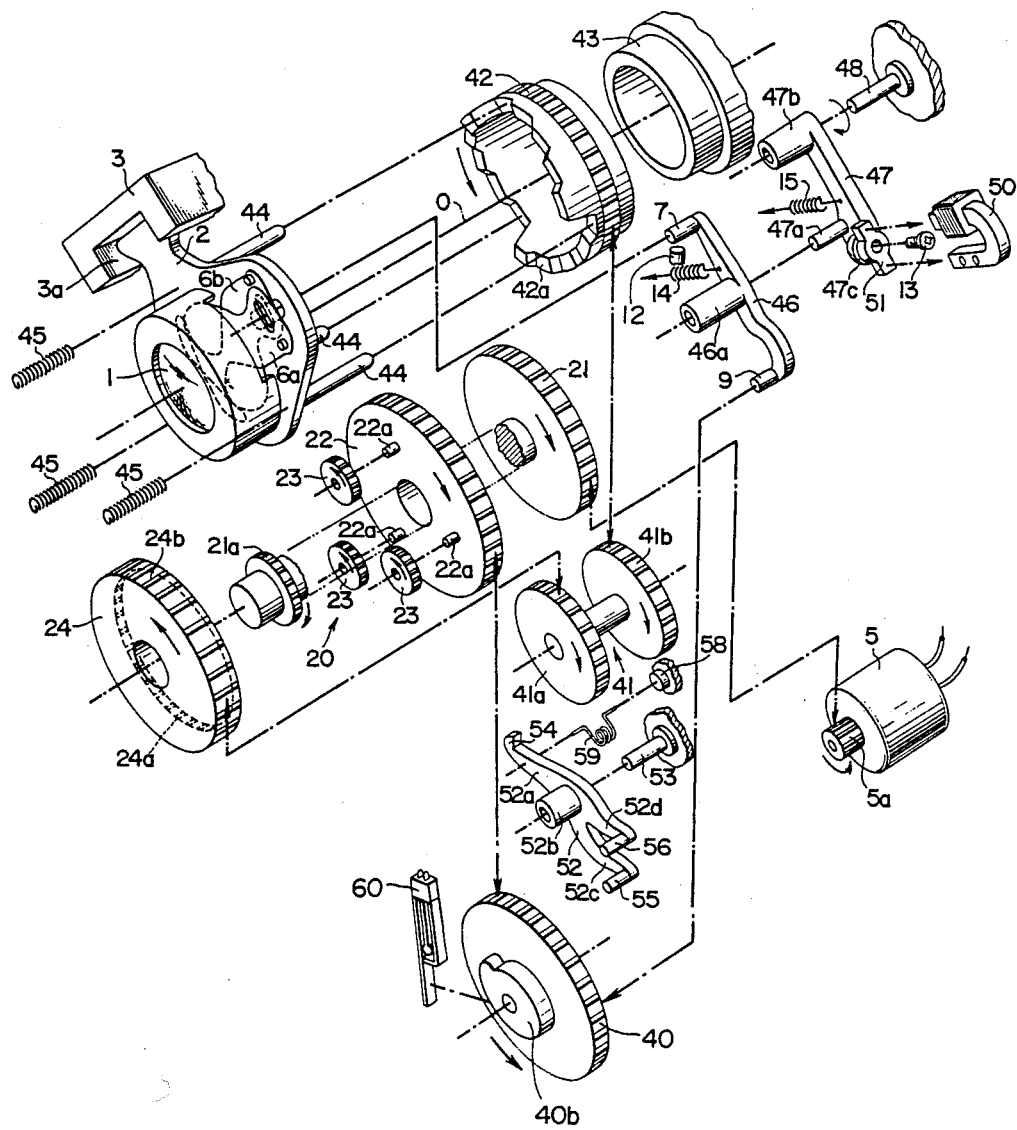
FIG. 3 is an exploded, perspective view of a rotational drive mechanism according to a second embodiment of the invention.

Referring to FIG. 3, a second embodiment of the invention will now be described. The second embodiment has a fundamental construction similar to the first embodiment, and therefore corresponding parts are designated by like reference characters. A motor 5 carries a drive gear 5a thereon, which meshes with a sun gear 21 of a differential gearing 20 which is similar to that of the previous embodiment, with its carrier 22 meshing with an AE gear 40. An internal gear 24 has external teeth 24b which mesh with one of the duplex gears, 41a, of a connection gear 41, the other gear 41b of which meshes with an AF gear 42. The AF gear 42 is formed around the external peripheral surface of a short sleeve, and has a front end face on which a zone focus AF cam 42a is formed, comprising a five-step face cam in each of three regions, which are subdivided from the full perimeter of the gear 42. The sleeve on which the AF gear 42 is defined is mounted on a substrate, not shown, so as to be rotatable about a lens sleeve 43 which supports part of a taking lens optical system. Disposed forwardly of the AF cam 42a is a lens barrel 2 which carries a taking lens 1 and sectors 6a, 6b and which is movable fore and aft along an optical axis O. Three drive pins 44 which are adapted to abut against the AF cam 42a are mounted on the rear surface of the lens barrel 2, and coiled compression springs 45 are interposed between the lens barrel 2 and a stationary member, not shown, at a position which is on the front surface of the barrel 2 in alignment with the respective drive pin 44, thus urging the drive pins 44 against the AF cam 42a.

Figure 4:
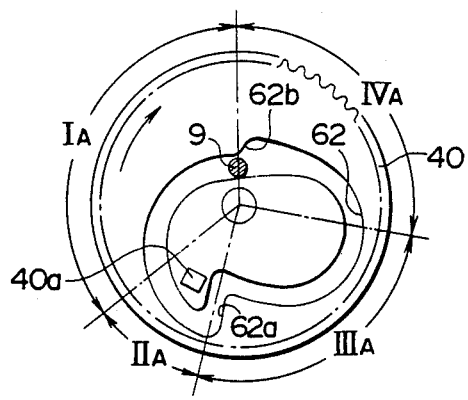
FIG. 4 is a rear view, to an enlarged scale, of an AE gear shown in FIG. 3.

A pin 7 which is used to open and close the sectors 6a, 6b is secured to the end of one arm of an opening and closing lever 46 which is formed with a support sleeve 46a midway its length and defining a fulcrum. The sleeve 46a is rotatably fitted around a support shaft 47a carried by a support arm 47, and a coiled tension spring 14 engages the described arm of the lever 46 to urge it to rotate counter-clockwise about the shaft 47a. The other arm of the lever 46 is curved in a semi-circular configuration, with an AE drive pin 9 fixedly mounted on the free end thereof, the pin 9 being fitted into an AE cam groove 62 (see FIG. 4) which is formed in the rear surface of the AE gear 40.

At its one end, the support arm 47 is formed with a support sleeve 47b which is rotatably fitted on a support shaft 48 which is in turn fixedly mounted on a substrate. The shaft 47a is fixedly mounted on the arm 47 adjacent to the other end, with an armature mount 47c being mounted on the other end along its one lateral side. An armature 51, which is adapted to be held attracted by an electromagnetic solenoid 50, is mounted on the armature mount 47c by a locking screw 13 with a spring 19 (see FIG. 1) interposed therebetween. As shown, the arm 47 is engaged by a spring 15, which urges it to rotate clockwise.

A detent lever 52 having three arms is engageable with and disengageable from the gear 41l of the connection gear 41 for controlling the rotation thereof. The lever 52 is formed with a support sleeve 52b at its central position, which is rotatably fitted on a support shaft 53 fixedly mounted on a substrate and defining a fulcrum. Lever 52 includes a first arm 52a extending toward the gear 41a, and a detent pawl 54 is formed on the free end of arm 54 for engagement with and disengagement from the gear 41a. The lever 52 also has a second arm 52c generally extending in the opposite direction from the first arm 52a, and a detent pin 55 is fixedly mounted on the free end of the second arm so as to be driven by the drive pin 9. The lever 52 also has a third arm 52d which extends obliquely above the second arm 52c, fixedly carrying a release pin 56 on its free end which is adapted to be driven by a detent releaser 40a (see FIG. 4) to be described later which is formed to project from the rear surface of the AE gear 40. A toggle spring 59 extends between the first arm 52a toward its free end and a spring anchorage 58 on a substrate for securing a detent position and a released position of the detent lever 52 with respect to the gear 41a.

A disc cam 40b is integrally formed on the front surface of the AE gear 40 to operate an AE switch 60 which functions to derive a signal indicating the position of the gear. An AE cam groove 62 in which the AE drive pin 9 is fitted is defined in the rear surface of the AE gear 40 in a manner illustrated in FIG. 4. Specifically, the cam groove 62 includes regions IA to IIIA, generally in a manner similar to the first embodiment, with a detent area 62a, formed by a radially extending linear cam groove, being formed at the boundary between the region IIA and the region IIIA. When the AE drive pin 9 abuts against the sidewall of the detent area 62a, the rotation of the AE gear 40 is temporarily interrupted. The detent releaser 40a, formed by a projection, is provided on the rear surface of the AE gear 40 at a location close to and on the clockwise advanced position of the detent area 62a, as viewed in FIG. 4, for driving the release pin 56 on the detent lever 52.

Figure 5:
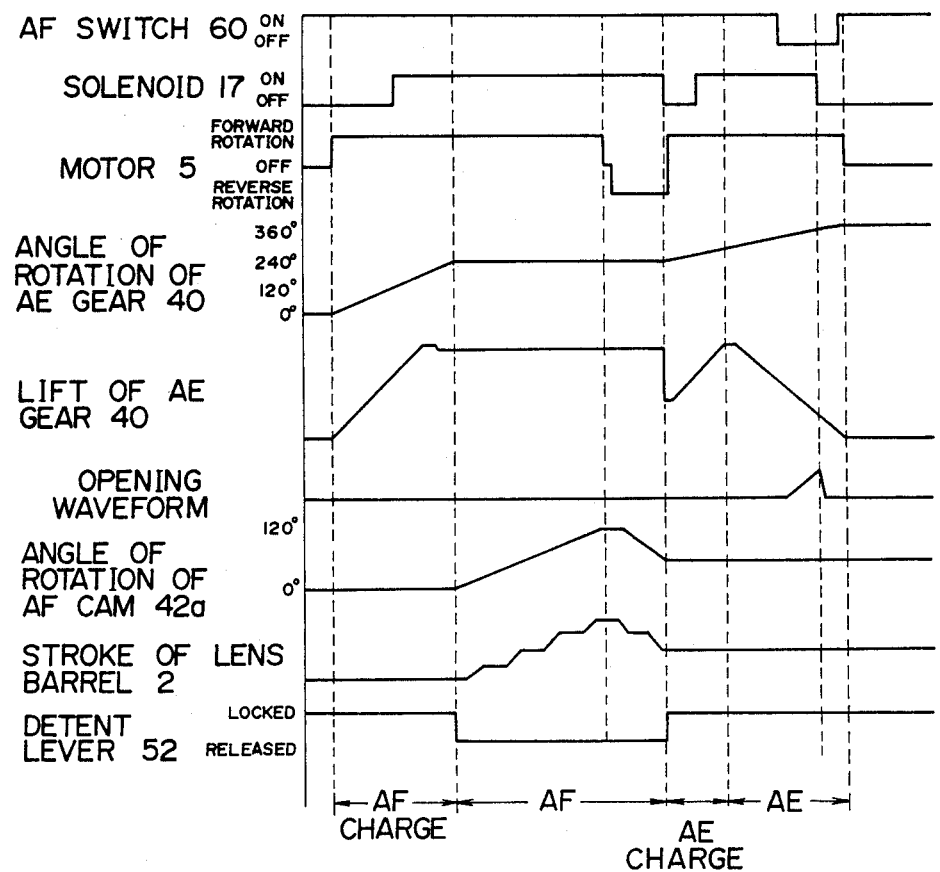
FIG. 5 is a series of timing charts illustrating the operation of the second embodiment.
Figure 6A:
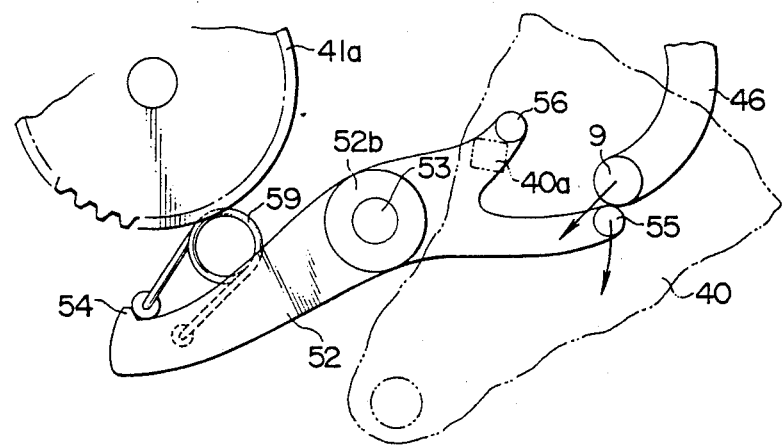
FIGS. 6A and 6B are front views, to an enlarged scale, of part of the arrangement shown in FIG. 3 and showing different operating positions, principally illustrating the operation of a detent lever.

The operation of the second embodiment mentioned above will now be described with reference to a series of timing charts shown in FIG. 5 and diagrams of FIGS. 6A and 6B which illustrate the operation thereof. Initially, when the motor 5 is energized to rotate the drive gear 5a in a direction indicated by the arrow shown in FIG. 3, the internal gear 24, representing one of the output gears of the differential gear 20, does not rotate since the gear 41a of the connection gear 41 is locked by the detent lever 52. Accordingly, as the planet gears 23 revolve, the other output gear or carrier 22 rotates, transmitting a drive to the AE gear 40 which therefore rotates in a direction indicated by an arrow in FIG. 3.

In response to the rotation of the the AE gear 40, the AE switch 60 is turned on by the operation of the disc cam 40b, which signal is effective to energize the solenoid 50. The rotation of the AE gear 40 is effective to move the AE drive pin 9 through the region IA of the AE cam groove 62 shown in FIG. 4, and such movement is transmitted through the opening and closing lever 46 to cause the support arm 47 to rotate counter-clockwise about its support shaft 48. The armature 51 is held attracted by the solenoid 50 at the boundary position with the region IIA. In response to a further rotation of the AE gear 40, the pin 9 moves through the region IIA, and the support arm 47 continues its rotation to reach an overcharge position while tensioning the spring 19, not shown (see FIG. 1) interposed between the arm 47 and the armature 51. As the AE gear 40 further rotates, the detent releaser 40a drives the release pin 56 on the detent lever 52 as shown in FIG. 6A, whereupon the detent lever 52 momentarily changes its operation to rotate counter-clockwise about the support shaft 53, whereby the detent pawl 54 is disengaged from the gear 41a, thus ceasing to lock the connection gear 41 which then becomes rotatable. At this time, the drive pin 9 drops into the detent area 62a of the cam groove 62 through a stroke corresponding to an overcharge stroke and bears against the sidewall of the detent area 62a to cease the rotation of the AE gear 40. When the rotation of the AE gear ceases, the carrier 22 is no longer rotatable, and hence the rotation of the planet gears 23 is now effective to cause the internal gear 24 of the differential gearing 20 to rotate, thus transmitting the drive to the connection gear 41.

The AF gear 42 which has been in meshing engagement with the gear 41b then rotates, performing an AF operation. The AF operation takes place in response to the rotation of the motor 5 in either forward or reverse direction. Specifically, when the AF cam 42a rotates in a direction of an arrow shown, the face cam formed thereon is effective to drive the lens barrel 2 forward. Alternatively, when the AF cam 42a rotates in a reverse direction, the lens barrel 2 is driven stepwise in the rearward direction.

When the taking lens 1 is brought by the action of the AF cam 42a to its in-focus position which is determined as a result of the distance measurement, the solenoid 50 ceases to be energized, whereupon the support arm 47 rotates in a direction indicated by an arrow about its support shaft 48 under the resilience of the spring 15, causing the drive pin 9 to move through the detent area 42a of the cam groove 62 toward the center, thus terminating the locking action upon the AE gear 40, which then becomes rotatable again.

Figure 6B:
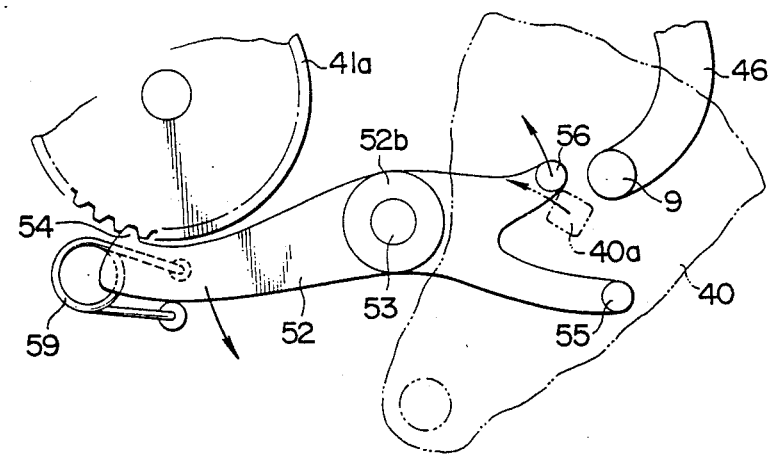

When the drive pin 9 moves through the detent area 62a toward the center in the manner mentioned above, the detent pin 55 on the detent lever 52 is driven by the AE drive pin 9 as shown in FIG. 6B, and accordingly the detent lever 52 momentarily rotates clockwise about its support shaft 53, causing the detent pawl 54 to be engaged with the gear 41a to lock the connection gear 41 again. As a consequence, the AF gear 42 and the AF cam 42a stop their movement at the in-focus position, thus completing the AF operation.

When the connection gear 41 is locked, the internal gear 24 of the differential gearing 20 also ceases to operate, and accordingly the rotational drive from the carrier 22 is transmitted to the AE gear 40 again. When the AE gear 40 begins to rotate, the drive pin 9 moves through the region IIIA of the cam groove 62, and the solenoid 50 becomes energized to hold the armature 51 attracted thereto, thus allowing the support arm 47 to be held by the solenoid 50 again. Subsequently, when the drive pin 9 enters the region IVA of the cam groove 62, the opening and closing lever 46 rotates clockwise about its support shaft 46a, whereby the sectors 6a, 6b on the lens barrel 2 are opened by the pin 7 to initiate an exposure process. At a time slightly before this, the AE switch 60 is turned off, and the resulting off signal is used as a trigger signal to operate an AE control circuit, not shown, allowing an integrating operation of the amount of light received to be started for purpose of AE operation. When the described control circuit delivers an exposure terminate signal, the solenoid 50 ceases to be energized, whereupon the support arm 47 rotates clockwise under the resilient of the spring 15 to close the sectors 6a, 6b to terminate the exposure operation.

If the rotation of the motor 5 is interrupted when the drive pin 9 abuts against the detent area 62b (see FIG. 4) of the cam groove 62, the sectors 6a, 6b, forming a shutter, can be maintained open until the solenoid 50 is deenergized, thus enabling an exposure process over an increased length of time. It will be appreciated that in the second embodiment, a pair of loads can be alternately locked without causing any significant increase in the number of parts used as compared with the first embodiment, thus achieving a stable operation with a reduced cost.

Figure 7:
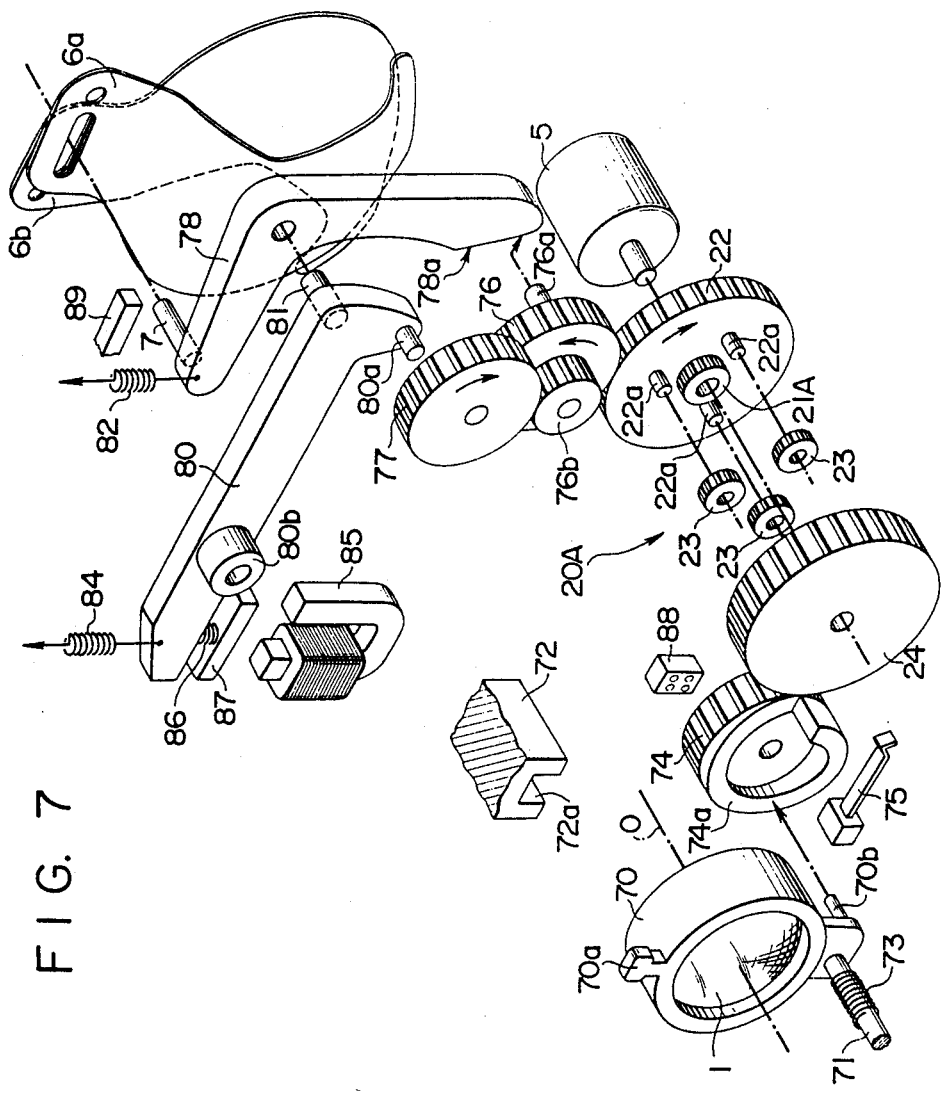
FIG. 7 is an exploded, perspective view of a rotational drive mechanism according to a third embodiment of the invention.

FIG. 7 shows a third embodiment of the invention, as applied to an exposure/focus controlling apparatus in a manner similar to the first and the second embodiment. Specifically, a taking lens 1 is carried by a lens barrel 70 which is supported by a support shaft 71 extending along an axis parallel to an optical axis O. The barrel includes a projection 70a which fits in a guide groove 72a formed in a rotational stop 72, thus enabling a displacement of the lens barrel in the direction of the optical axis. A spring 73 is disposed on the shaft 71 and urges a projection 70b, integral with the lens barrel 70, against an AF cam surface 74a which is defined on the front end face of an AF gear 74. The AF gear 74 meshes with an internal gear 24 of a differential gearing 20A. At a location where an interference with a meshing engagement between the gears 74 and 24 is avoided, a click spring 75 is disposed for abutment against the AF gear 74, whereby a rotation of the gear 74 is loaded by a clicking action. The differential gearing 20A includes a carrier 22 which meshes with an AE gear 76. A pin 76a formed on the rear surface of the AE gear 76 extends to a cam surface 78a formed on one arm of an opening and closing lever 78. The lever 78 is mounted on a support pin 81 on a support arm 80, which defines a fulcrum for the lever, and is urged to rotate clockwise by a spring 82 engaged with the other arm of the lever 78 on which a pin 7 for opening and closing shutter sectors 6a, 6b is fixedly mounted. Thus, the spring 82 urges the lever 78 in a direction to open the sectors 6a, 6b. A control member 89 which controls the aperture of the shutter is disposed for displacement into a path of movement of the pin 7 which occurs under the resilience of the spring 82 in interlocked relationship with a zoom ring, not shown, for example. A gear 76b of a reduced diameter is integral with the AE gear 76 and meshes with a detent gear 77 The gears 76b and 77 have a gear ratio of 1:2. Thus, the detent gear 77 goes through one-half revolution during one revolution of the AE gear 76.

A cam 83 configured as illustrated in FIGS. 8A to 8F is formed on the back surface of the detent gear 77 The cam 83 is engaged by a pin 80a which is fixedly mounted on a support arm 80 to control its movement. Specifically, the cam comprises a guide portion 83a extending along the peripheral surface of the detent gear 77, a detent area 83b formed therein and extending toward the inside, and another detent area 83c which extends from a position adjacent to the detent area 83b, advanced clockwise, as viewed from the rear side of the detent gear 77 or as viewed in FIGS. 8A to 8F thereof, to the center of rotation of the detent gear 77. The support arm 80 includes a support sleeve 80b intermediate its length, which fits on a support shaft, not shown, and is urged to rotate clockwise, as viewed in FIG. 7, by a spring 84. An armature 87 is carried by the support arm 80 at a location which opposes an electromagnetic solenoid 85, with a spring 86, which is tensioned when the support arm 80 is displaced to its overcharged position interposed therebetween.

Figure 8A:
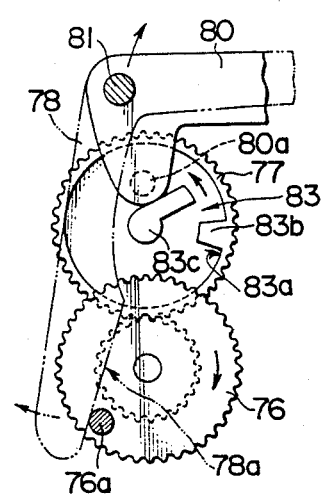
FIGS. 8A to 8F are schematic views, illustrating a series of operational phases of the third embodiment.
Figure 8B:
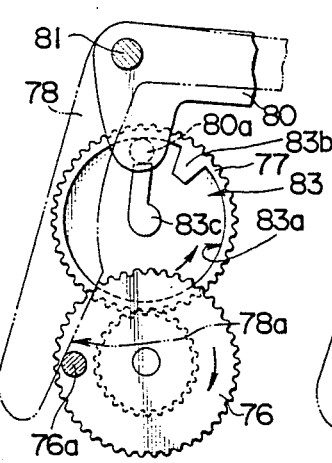
Figure 8C:
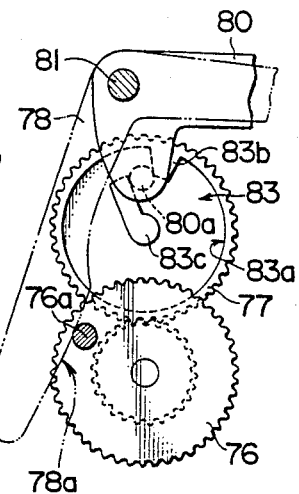
Figure 8D:
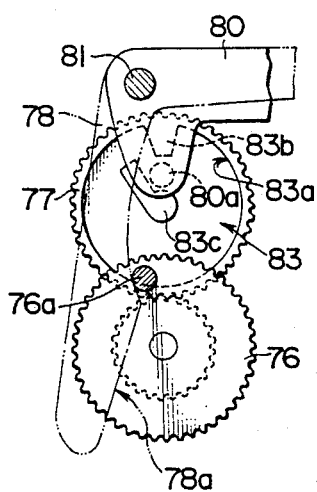
Figure 8E:
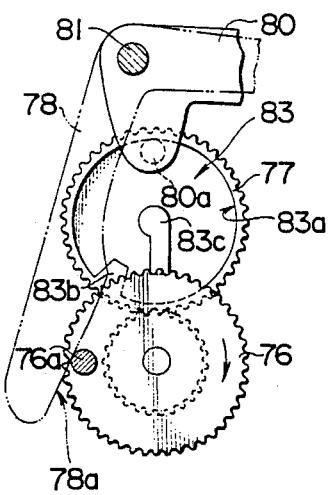
Figure 8F:
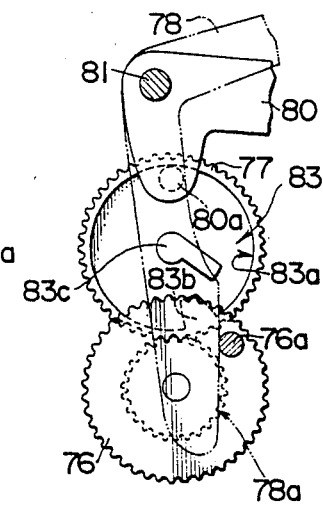

The operation of the third embodiment will now be described with reference to FIGS. 8A to 8F. When the motor 5 is set in motion, the rotational drive therefrom is transmitted to the differential gearing 20A through a sun gear 21A which is directly coupled to the output shaft of the motor 5, but since the AF gear 74 is loaded by the click spring 75, the internal gear 24 cannot rotate, and the rotation is transmitted to the carrier 22 to rotate the AE gear 76. Assuming that the carrier 22 rotates in a direction indicated by an arrow in FIG. 7, the AE gear 76 rotates in a direction indicated by an arrow as shown in FIG. 8A, whereby the pin 76a on the gear 76 presses against the cam surface 78a of the opening and closing lever 78, which then rotates in a direction indicated by an arrow while the end of the pin 7 is held in abutment against its abutment surface, not shown. This movement of lever 78 is transmitted through the support pin 81 to the support arm 80, which is in turn rotated or charged in a direction indicated by an arrow against the resilience of the spring 84, thus raising the position of the pin 80a. As shown in FIG. 8B, the pin 80a reaches an elevation where it is substantially in contact with the guide portion 83a so as to be located opposite to the detent area 83c. The support arm 80 assumes its overcharged position under this condition, and the armature 87 is pressed against the solenoid 85 by the tensioned spring 86 and is also held attracted by the energized solenoid 85. In response to a further rotation of the AE gear 76, the pin 80a drops between the detent areas 83a and 83c as shown in FIG. 8C, whereby the support arm 80 returns through a stroke corresponding to the overcharge stroke under the resilience of the tensioned spring 86. Under the condition shown in FIG. 8C, the pin 80a on the support arm 80 is held between the detent areas 83b and 83c of the detent gear 77, whereby the rotation of both the detent gear 77 and the carrier 22 is blocked in either direction. As the rotation of the carrier 22 is blocked, the AF gear 74 rotates by overcoming the resilience of the click spring 75 in response to the rotation of the internal gear 24. The motor 5 then rotates in either forward or reverse direction depending on a focal condition, and hence a focussing operation of a lens barrel 70 may take place in either forward or rearward direction in response to the rotation of the AF gear 74. The position of the lens barrel 70 is detected by a photo-reflector 88 which reads a reflective pattern, not shown, formed on the rear surface of the AF gear 74. When a focus control is performed until an output from the photo-reflector 88 coincides with an output from a distance measuring unit, the solenoid 85 is deenergized, allowing the support arm 80 to rotate clockwise as viewed in FIG. 7 under the resilience of the spring 84. The pin 80a then drops to a point near the base of the detent area 83c, which is close to the center of the detent gear 77, as shown in FIG. 8D, whereby it is released from the locked condition held between the detent areas 83b and 83c. At this time, the abutment of the pin 76a on the AE gear 76 against the cam surface 78a on the opening and closing lever 78 is also terminated, whereupon the AF gear 74 which carries a greater load ceases to rotate while the AE gear 76 begins to rotate. The rotation of the AE gear 76 brings the pin 76a into abutment against the cam surface 78a to raise the opening and closing lever 78 again, as shown in FIG. 8D, whereby the support arm 80 is charged again to cause the armature 87 to be held attracted by the solenoid which is energized again. As a result of such movement of the pin 80A, detent areas 83b and 83c are located remote from the pin 80a, thus presenting no interference with the movement of the pin 80a. In response to a further rotation of the AE gear 76 to cause a corresponding movement of the pin 76a, the lever 78 having the cam surface 78a against which the pin 76a abuts is allowed to rotate in following relationship with the movement of the pin 76a under the resilience of the spring 82, as illustrated in FIG. 8F, thus, opening the shutter sectors 6a, 6b to perform an exposure process. The sectors 6a, 6b assume their open condition when the pin 7 abuts against the control member 89. The aperture which is achieved when the sectors are open can be changed by displacing the position of the control member 89. When a proper exposure has been made, the solenoid 85 is deenergized again, whereby the support arm 80 rotates under the resilience of the spring 84 to close the sectors 6a, 6b, thus completing the exposure operation. In the third embodiment, the lever 78 is engage by the spring 82 which urges the sectors 6a, 6b in their opening direction, and accordingly the aperture of an open shutter can be easily controlled.

Figure 9:
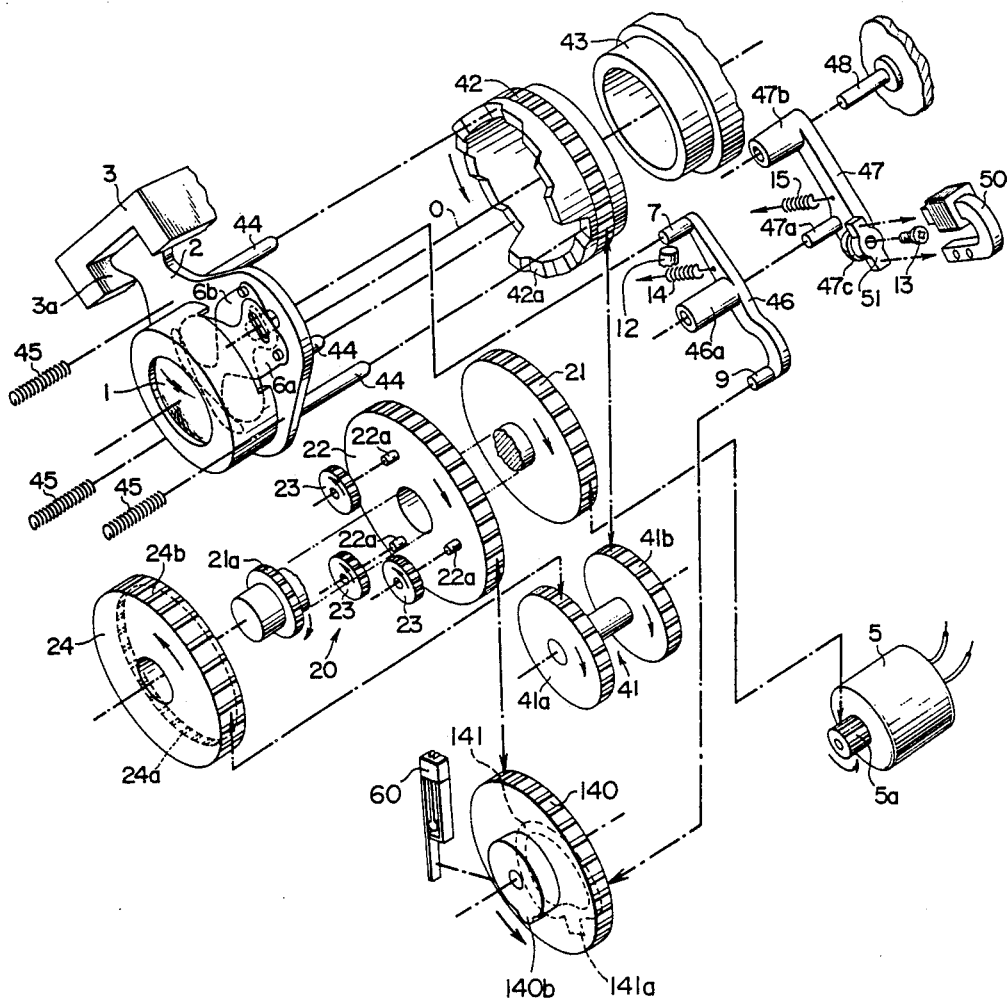
FIG. 9 is an exploded, perspective view of a rotational drive mechanism according to a fourth embodiment of the invention.

FIG. 9 shows a fourth embodiment of the invention, which is constructed in a manner similar to the second embodiment shown in FIG. 3. Accordingly, to avoid duplicated description, only the modified portion will be described. It is to be noted that in this embodiment, the detent lever 52 (see FIG. 3) which has been used previously to lock the connection gear 41 is omitted. In addition, on its rear side, the AF gear 42 which meshes with the gear 41b of the connection gear 41 is formed with a suitable number of reflective patterns 42b around its outer peripheral surface for detecting the rotational position and the direction of rotation of AF gear 42. A rotation detector 49 comprising a photo-reflector or the like is disposed in opposing relationship with such reflective patterns 42b.

A differential gearing 20 includes a carrier 22 which meshes with an AE gear 140. Integrally formed on the front surface of the gear 140 is a disc cam 140b which opens or closes an AE switch 60 which is used to derive a signal representing the position of the gear 140. As shown in FIGS. 10A to 10F, an AE cam groove 141 defining a closed loop having an "apple-shaped" configuration is formed in the rear surface of the gear 140. It is to be noted that FIGS. 10A to 10F are depicted as viewed from the front side of the camera. An AE drive pin 9, acting as a cam follower, fixedly mounted on an end of an opening and closing lever 46A which is configured similar to the lever 46 described above in connection with the second embodiment, fits in the AE cam groove 141. The cam groove 141 includes a pair of cam regions I and II which are symmetrically disposed with respect to a centerline extending through the center of rotation of the gear 140, with an engaging groove 141a on the centerline and extending radially outward and having a configuration which corresponds to the stem of an apple. When the AE drive pin 9 engages the groove 141a, the rotation of the AE gear 140 is temporarily interrupted.

The operation of the fourth embodiment will now b described with reference to FIGS. 10A to 10F which illustrate different phases of operation. When the motor 5 begins to rotate in a forward direction, a drive gear 5a rotates forwardly or in a direction indicated by an arrow, causing a rotation of a sun gear 21 in one direction. This rotation of the sun gear 21 is transmitted through the gear 21a and planet gears 23 to the internal teeth 24a of an internal gear 24. However, the resulting rotation of the internal gear 24, which represents one of the output gears of the differential gearing 20, is blocked since it carries a load connected through a connection gear 41, namely, an AF gear 42 having an AF cam 42a of a focus controlling mechanism as well as a lens barrel 2 carrying a taking lens 1, which is far greater than the load connected to a carrier 22, namely, the AE gear 140. Accordingly, the rotation of the sun gear 21 and the gear 21a is entirely transmitted to the carrier 22, the rotation of which is transmitted to the AE gear 140.

Figure 10A:
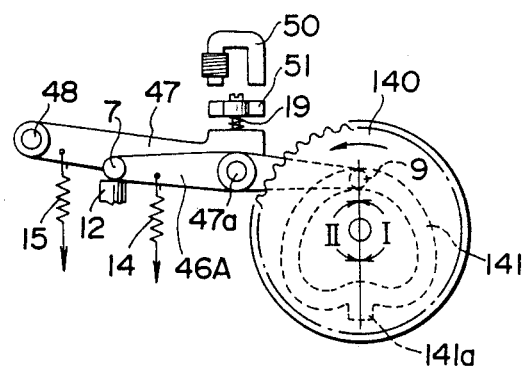
FIGS. 10A to 10F are schematic views illustrating a series of operational phases of the arrangement shown in FIG. 9, principally illustrating the relationship between an AE cam groove formed in an AE gear and an AE drive pin.
Figure 10B:
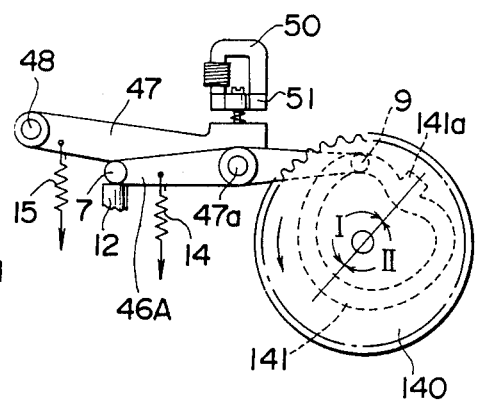
Figure 10C:
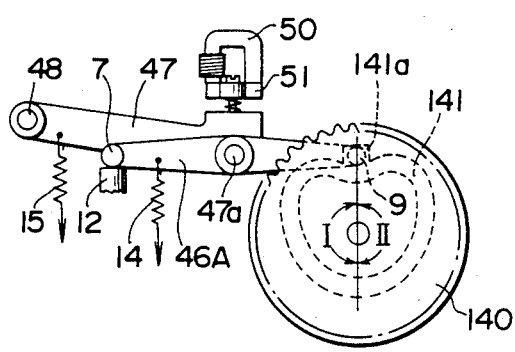

When the AE gear 140 rotates, the switch 60 is turned on by the operation of the cam 140b, whereby an electromagnetic solenoid 50 is energized. In response to a clockwise rotation of the gear 140 indicated by an arrow, the AE drive pin 9 which is engaged with the AE cam groove 141 formed in the AE gear 140 moves through a first cam region I of the cam groove 141 from its initial position shown in FIG. 10A, where it is closest to the center of rotation of the gear 140, toward a radially outward or peripheral position on the gear 140. An opening and closing lever 46A has a sector opening and closing pin 7 which is held in abutment against a stop 12 at its one end, so that as the AE drive pin 9 moves through the first cam region I away from the center of the cam groove 141, the lever 46A rotates counter-clockwise, as viewed in this Figure, about the pin 7 which serves as a fulcrum, causing a support arm 47 to rotate in the same direction about its support shaft 48. When the drive pin 9 reaches the outer periphery of the gear 140 which is located in the vicinity of an ultimate position within the cam region 1, an armature 51 is brought into abutment against and held attracted by the solenoid 50, as shown in FIG. 10B. In response to further rotation of the gear 140, the drive pin 9 once moves toward the center of rotation of the gear 140 slightly within the cam groove 141 to cause the lever 46A to rotate clockwise to a degree which prevents sectors 6a, 6b from being opened. Subsequently, the lever 46A slightly rotates counter-clockwise again, whereby the drive pin 9 fits in the engaging groove 141a in the cam groove 141 as shown in FIG. 10C.

Accordingly, the gear 140 is locked by the AE drive pin 9 under this condition, and cannot rotate in either direction. Thus, the gear 140 cannot rotate counter-clockwise, as indicated by an arrow, obviously, but also cannot rotate in the reverse direction from the direction indicated by the arrow if the motor 1 rotates in the reverse direction for purpose of focus control, as will be described later.

When the gear 140 is locked by the drive pin 9 and becomes unable to rotate, the carrier 22 of the differential gearing 20 is prevented from rotating. Accordingly, the planet gears 23 revolve and the internal gear 24 rotates. The rotation of the internal gear 24 is transmitted to the connection gear 41, whereby the AF gear 42 which meshes with the gear 41b rotates, thus performing a focus controlling operation. Upon transferring to a focus controlling operation, the motor 5 is enabled to rotate in either forward or reverse direction.

Assume now that the motor 5 rotates in the forward direction, as viewed in FIG. 9. When the rotation of the carrier 22 is blocked, the internal gear 24 and the connection gear 41 rotate in the direction of arrows, whereby the AF gear 42 rotates in a direction indicated by an arrow to drive the lens barrel 2 forward by means of AF cam 42a. Alternatively, when the motor 5 rotates in the reverse direction, the gears 24 and 41 rotate in the opposite direction from those indicated by arrows, whereby the AF gear 42 rotates in the opposite direction from the direction indicated by the arrow, causing the lens barrel 2 to be driven rearward by means of AF cam 42a. Thus, after the rotation of the carrier 22 is interrupted, the rotational drive in either direction from the motor 5 is transmitted through the internal gear 24 to the AF gear 42, which then is freely rotatable in either direction to change the driven position of the lens barrel 2 in a stepwise manner. The direction of rotation and the rotational position of the AF gear 42 is detected by a detector which may be of the same type as detector 37 of FIG. 1 and which has been described hereinabove, an output signal from which is used to complete a focus controlling operation when it matches with a output signal from a distance measuring unit.

An exposure process is initiated subsequent to the focus controlling operation. At the start of the exposure process, the solenoid 50 is once deenergized. The solenoid 50 then ceases to hold the armature 51 attracted thereto, whereby the resilience of the coiled spring 15 is effective to rotate the support ar 47 clockwise about its support shaft 48 as shown in FIG. 10D, whereby the drive pin 9 drops through the engaging groove 141a to a point close to the center of rotation of the gear 140, thus terminating the locking action upon the AE gear 140 against rotation.

When the locking action upon the AE gear 140 is terminated, the carrier 22 of the differential gearing 20 which has a smaller load becomes rotatable again while the internal gear 24 having a greater load ceases to rotate, and thus the drive from the carrier 22 is again transmitted to the AE gear 140. Accordingly, merely interrupting the energization of the solenoid 50 is effective to transfer from the focus controlling operation to the exposure controlling operation and to re-initiate the rotation of the AE gear 140 for purpose of the exposure control without requiring the drive of the motor 5 to be stopped at the time the focus control has been completed. By way of example, if the motor 5 has been rotating in the forward direction as indicated by an arrow during the focus controlling operation, thus feeding the lens barrel 2 forward, at the time when the drive pin 9 drops through the engaging groove 141a to a position shown in FIG. 10D, the AE gear 140 will rotate clockwise as shown in FIG. 10D to initiate an exposure controlling operation immediately in response to the rotation of the motor 5 in the forward direction. Conversely, if the motor 5 has been rotating in the reverse direction during the focus controlling operation, thus feeding the lens barrel 2 rearward, at the time the drive pin 9 terminates the locking action upon the gear 140, the gear 140 rotates counter-clockwise, thus in the opposite direction from that indicated in FIG. 10D in response to the rotation of the motor 5 in the reverse direction, similarly initiating the exposure controlling operation.

Figure 10D:
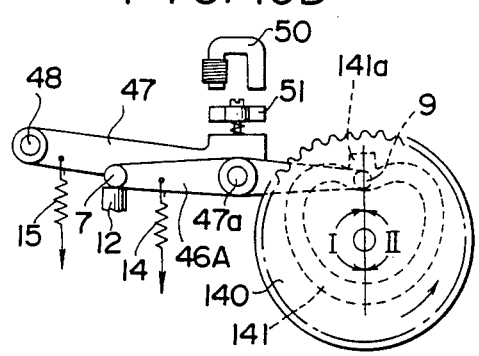
Figure 10E:
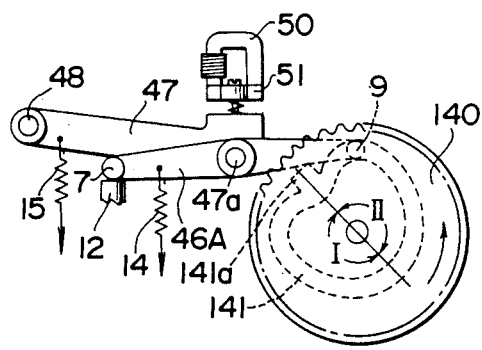
Figure 10F:
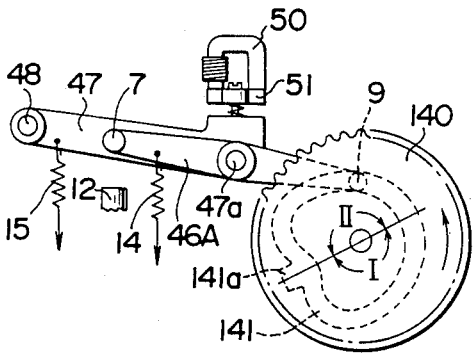

After the completion of the focus controlling operation which feeds the lens barrel 2 forward, when the AE gear 140 begins its counter-clockwise rotation again under the condition shown in FIG. 10D in order to initiate an exposure controlling operation, the AE drive pin 9 moves through the second cam region II in the cam groove 141. As shown in FIG. 10E, the drive pin 9 moves in a direction away from the center of rotation of the gear 140 through the cam region II, whereby the support arm 47 rotates counter-clockwise again in which it is charged, and when the drive pin 9 reaches a position closest to the outer periphery of the AE gear 140, the armature 51 is pressed against and is held attracted by the solenoid 50 which is then energized. Under this condition, the support arm 41 is maintained in its charged position, and accordingly, subsequently when the drive pin 9 moves through the cam region II, in the cam groove 141 in response to the rotation of the AE gear 140, the drive pin 9 now moves in a direction toward the center of rotation of the gear 140 in conformity to the cam groove 141. This allows the opening and closing lever 46A to be rotated clockwise about its support shaft 48, and accordingly the sectors 6a, 6b on the lens barrel 2 are opened by the pin 7 to initiate an exposure process. At a timing slightly earlier than this, the AE switch 60 is turned off, and the resulting trigger signal or off signal activates an AE control circuit, not shown, initiating an integrating operation for an amount of light received for purpose of AE operation. As shown in FIG. 10F, the sectors 6a, 6b are gradually opened as the gear 140 further rotates. When the drive pin 9 reaches its initial position shown in FIG. 10A, the sectors 6a, 6b are fully opened. When the drive pin 9 is thus positioned relative to the cam groove 141 to achieve a proper exposure, the control circuit mentioned above delivers a signal to terminate the exposure process, whereupon the solenoid 50 is deenergized. The solenoid 50 then becomes deactivated, whereby the support arm 47 rotates clockwise under the resilience of the coiled spring 15, rotating the lever 46A counter-clockwise against the resilience of the coiled spring 14. When the opening and closing pin 7 reaches a position which is controlled by the stop 12, the sectors 6a, 6b are closed, thus terminating the exposure operation.

As mentioned previously, when the exposure controlling operation is initiated after the focus controlling operation which feeds the lens barrel 2 rearward, the AE gear 140 begins to rotate clockwise from its unlocked condition shown in FIG. 10D in response to the rotation of the motor 5 in the reverse direction. Accordingly, the drive pin 9 moves through the first cam region I in the cam groove 141. Since the cam regions I and II are configured to be symmetrical with respect to each other, the locus which the drive pin 9 follows is similar to that mentioned above in connection with FIGS. 10D to 10F, with a similar exposure controlling operation. Alternatively, rather than employing symmetrical configurations for the cam regions I and II, it is also possible that the cam region I be configured to exhibit a steeper inclination than the cam region II to increase the speed of movement of the drive pin 9 through the cam region II, thus changing the speed with which the sectors 6a, 6b are opened between the rotation of the motor 5 in the forward and the reverse direction.

In the fourth embodiment, a focus controlling member can be driven in either direction while avoiding a complex mechanism and retaining a simple controlling operation. Since the focus controlling operation takes place without requiring a reset operation, a servo AF or continuous AF is enabled, and also a time lag which is involved when transferring from the focus controlling operation to the exposure controlling operation is greatly reduced.

While the first to the fourth embodiments mentioned above represent the application of the invention to an exposure/focus controlling apparatus of camera, it should be understood that the invention is not limited in its applicability to such apparatus. By way of example, a fifth embodiment of the invention as applied to an apparatus for changing a focal length of a lens and for performing a wind-up/rewind will now be described.

Figure 11:
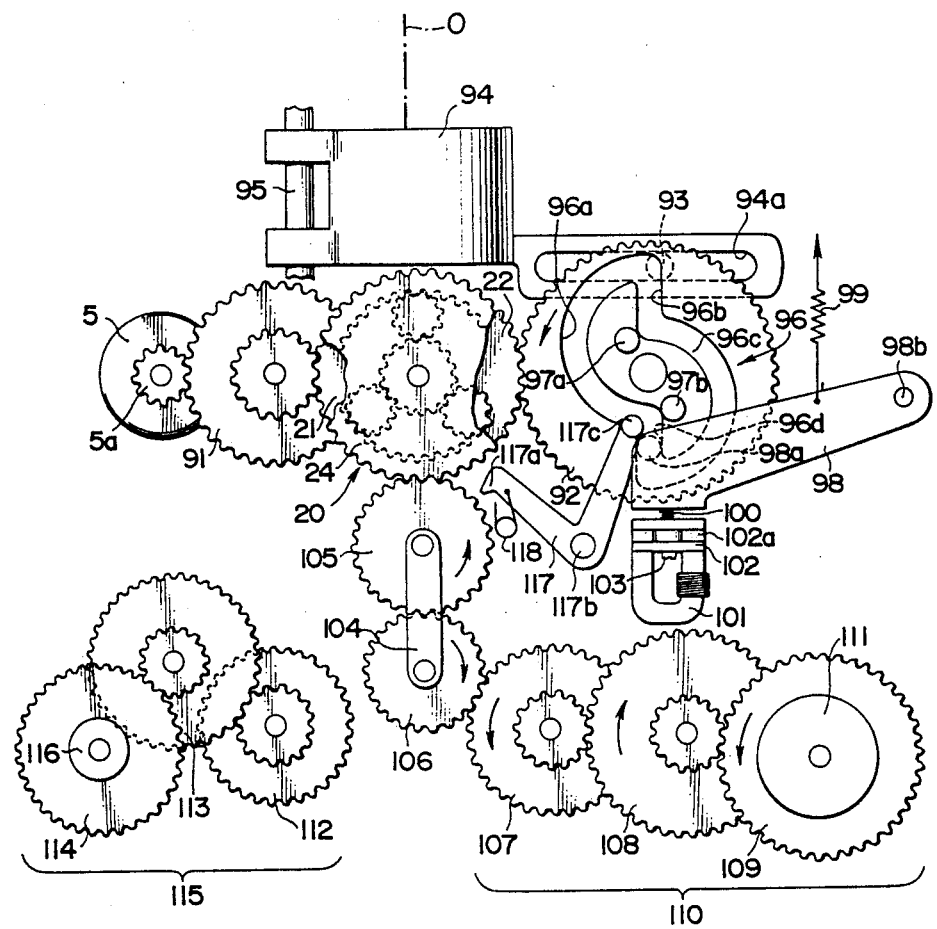
FIG. 11 is a plan view of a rotational drive mechanism according to a fifth embodiment of the invention.

FIG. 11 shows a fifth embodiment of the invention in plan view. Specifically, a drive gear 5a is fixedly mounted on the output shaft of a motor 5, and is disposed for meshing engagement with a sun gear 21 of a differential gearing 20, which is similar to that shown in FIGS. 1 and 3, through a gear 91. A carrier 22, representing one of the output gears of the differential gearing 20, meshes with a focal length changing gear (hereafter abbreviated as "T/W gear") 92, which carries a lens moving pin 93 on its backside which is adapted to be fitted in an elongate slot 94a formed in a lens barrel 94. The lens barrel 94 carries a variable magnification lens, not shown, and is supported by a support shaft 95 for movement in the direction of an optical axis in order to change the focal length. As shown, a cam groove 96 comprising a pair of curved portions 96a, 96c and a pair of radially extending, linear detent areas 96b, 96d which join the curved portions is formed in the T/W gear 92 so as to exhibit point symmetry with respect to the center of the rotation of the gear 92 or 180° rotation symmetry to each other. Also fixedly mounted on the gear 92 are a pair of pins 97a, 97b at locations which exhibit point symmetry. Fitted into the cam groove 96 is a pin 98a which is fixedly mounted on the free end of a support arm 98 which is urged to rotate about its support shaft 98b by means of a spring 99. Mounted on the free end of the support arm 98 is an armature 102 by a locking screw 103 so as to be held attracted by an electromagnetic solenoid 101. In the present embodiment, the combination of the solenoid 101 and the armature 102 constitutes together a solenoid of release type which may be sometimes referred to as a combination solenoid by providing a permanent magnet 102a on the armature 102. As the other output gear, the differential gearing 20 includes an internal gear 24 which meshes with a changing gear 105, which is connected to another changing gear 106 through a connecting arm 104. Depending on the direction of rotation, the changing gear 106 selectively meshes with either a wind-up gear train 110 comprising gears 107 to 109 which transmits the rotation to a spool 111 or a rewind gear train 115 comprising gears 112 to 114 which transmits the rotation to a rewind fork 116. A detent lever 117 is disposed alongside the changing gear 105, and when the lever 117 moves angularly about its support shaft 117b in a manner to be described later, it is movable between a position in which a detent pawl 117a mounted on the free end of its one arm locks the changing gear 105 and another position in which it is unlocked under the resilience of a toggle spring 118 which is connected to the free end of its one arm. The detent lever 117 includes another arm, on the free end of which is fixedly mounted a pin 117c which cooperates with the pins 97a, 97b and 98a.

In operation, under the condition shown in FIG. 9, T/W gear 92 assumes a rotational position in which the pin 93 is located foremost, and accordingly the lens barrel 94 is fed forward to assume its telescope position. At this time, the solenoid 101 is deenergized, but holds the armature 102 attracted thereto, and hence the support arm 98 rotates counter-clockwise against the resilience of the spring 99 to be carried by the solenoid. Accordingly, the pin 98a on the support arm 98 is located within the detent area 96d of the cam groove 96, whereby T/W gear 92 is blocked from rotating. The detent lever 117 unlocks the changing gear 105, and the changing gear 106 meshes with the gear 107 in the wind-up gear train 110. Accordingly, under the condition shown in FIG. 9, the changing gears 105, 106 rotate in directions indicated by arrows in response to a rotation of the motor 5 in the forward direction, enabling the rewind direction of the spool 111. If a rewind operation is to be performed now, the motor 5 may be rotated in the reverse direction, whereupon the changing gear 106 moves to the left as viewed in FIG. 11 into meshing engagement with the gear 112 in the rewind gear train 115, thus enabling a rotation of the rewind fork 116.

To transfer from a wind-up/rewind operation to a focal length controlling operation, the solenoid 101 is momentarily energized to release the armature 102, whereupon the spring 99 causes the support arm 98 to rotate clockwise, causing the pin 98a to be moved toward the center of rotation of the T/W gear 92 to get out of the detent area 96d in the cam groove 96, thus unlocking the T/W gear 92. At the same time, the pin 98a drives the pin 117c on the detent lever 117, whereby the toggle spring 118 is effective to rotate the detent lever 117 counter-clockwise in one stroke, thus causing the detent pawl 117a to lock the changing gear 105.

Subsequently when the T/W gear 92 rotates through 180° counter-clockwise in response to the rotation of the motor 5, the lens barrel 94 is fed rearward by means of the lens moving pin 93 to be situated at its wide angle position. As the gear 92 rotates, the pin 98a moves from a position toward the center in a direction toward the outer periphery of the gear 92 in conformity to the curved portion 96a of the cam groove 96, whereby the support arm 98 rotates counter-clockwise to be charged. The armature 102 is held attracted by the solenoid 101, which thus holds the support arm 98. Immediately before the completion of the rotation through 180°, the spring 100 is tensioned, whereby the support arm 98 is overcharged. When the wide angle position is reached upon completion of the rotation through 180°, the pin 98a drops through the detent area 96d in the cam groove 96 by an amount corresponding to its overcharge stroke under the resilience of the spring 100, thus locking the gear 92. At this time, the pin 97a on the gear 92 drives the pin 117c on the detent lever 117, thus rotating the lever 117 clockwise to unlock the changing gear 105 to enable the wind-up/rewind operation. The described operation takes place similarly at the wide angle position.

In the fifth embodiment, a power transmission mechanism including the differential gearing 20 is effective to drive different loads selectively from the single motor 5. The use of the solenoid of this type avoids the power dissipation while the T/W gear 92 is locked.

It is to be understood that in addition to various embodiments mentioned above, the invention is equally applicable to drive a free combination of two loads, provided these loads satisfy the requirement of the power transmission mechanism.

What is claimed is:
1. A rotational drive mechanism comprising:
a drive source adapted to rotate in either direction;
a differential gearing means driven by the drive source and including a pair of output gears, the differential gearing means operating in a manner such that one of the output gears which carries a smaller load is rotated from the drive source;
a first mechanism designed for rotation in a predetermined direction and requiring a constant magnitude of drive, the first mechanism being connected to one of the output gears of the differential gearing means;
a second mechanism requiring a drive of varying magnitude during its rotation in either direction, the second mechanism being connected to the other output gear of the differential gearing means, the motion of the second mechanism being inhibited when it carries a load greater than the load applied to the first mechanism or while the first mechanism is being driven;
solenoid means;
a displacement member urged in a direction away from the solenoid means and movable between a position in which it is urged away from the solenoid means, another position in which it is held attracted by the solenoid means and an overcharged position in which it is pressed against the solenoid means beyond the attracted position;
an engaging portion of the first mechanism and located to be in opposing relationship with the displacement member, the engaging portion engaging the displacement member when the latter assumes its attracted position to block the rotation of the first mechanism and being disengaged from the displacement member as it moves away from the solenoid when the solenoid ceases to hold it attracted; and
charging means disposed for abutment against the displacement member to press it to its overcharged position so that the displacement member is firmly held attracted by the solenoid, the charging means being operative when released from abutment against the displacement member to move the displacement member to its attracted position under the urging influence to engage it with the engaging portion.

2. A rotational drive mechanism according to claim 1 in which the first mechanism comprises an exposure control mechanism including an AE gear which meshes with one of the output gears of the differential gearing means, and in which the second mechanism comprises a focus controlling mechanism including an AF gear which meshes with the other output gear of the differential gearing means, the displacement member being an opening and closing lever carrying a drive pin which engages an AE cam groove formed in the AE gear, the rotation of the AE gear being blocked when the drive pin engages a detent area in the AE cam groove.

3. A rotational drive mechanism according to claim 1 in which the first mechanism comprises an exposure control mechanism including an AE gear which meshes with one of the output gears of the differential gearing means, and in which the second mechanism comprises a focus controlling mechanism including an AF gear which meshes with the other output gear of the differential gearing means through a connection gear which is prevented from rotating by being locked by a detent lever during a focus controlling operation, the displacement member being an opening and closing lever carrying a drive pin which engages an AE cam groove formed in the AE gear, the rotation of the AE gear being blocked when the drive pin engages a detent area in the AE cam groove.

4. A rotational drive mechanism according to claim 1 in which the first mechanism comprises an exposure control mechanism including a detent gear which meshes with one of the output gears of the differential gearing means, and in which the second mechanism comprises a focus controlling mechanism including an AF gear which meshes with the other output gear of the differential gearing means, the displacement member comprising a support arm carrying a pin which may engage with a detent area formed in the detent gear to block the rotation of the detent gear.

5. A rotational drive mechanism according to claim 1 in which the first mechanism comprises a wind-up/rewind mechanism including a changing gear which meshes with one of the output gears of the differential gearing means, the changing gear being prevented from rotating by being locked by a detent lever during a focal length controlling operation, and in which the second mechanism comprises a focal length controlling mechanism including a focal length changing gear which meshes with the other output gear of the differential gearing means, the displacement member comprising a support arm carrying a pin which may engage with a cam slot formed in the focal length changing gear, the rotation of the focal length changing gear being blocked when the pin engages a detent area in the cam groove.

6. An exposure/focus controlling apparatus comprising
a drive source adapted to rotate in either direction;
differential gearing means driven by the drive source and having plural output gears, one of which experiencing a smaller load is driven for rotation;
an exposure controlling mechanism connected to one of the output gears of the differential gearing means;
a focus controlling mechanism connected to the other output gear of the differential gearing means, the focus controlling mechanism representing a greater load than the exposure controlling mechanism;
a sector opening and closing lever for driving sectors, which define a shutter, for opening and closing movement;
a drive cam groove formed in an AE gear of the exposure drive mechanism for causing angular movement of the opening and closing lever by a cam follower pin mounted on the latter which fits in the cam groove;
a displacement member movable between a position in which it is held attracted by an electromagnetic solenoid and another position spaced from the solenoid, the displacement member carrying a fulcrum for the rotation of the opening and closing lever, the displacement member being operable to open the sectors by the rotation of the lever caused by the drive cam groove when it is at its attracted position and to close the sectors when it is at its spaced position;
means for urging the opening and closing lever in a direction to close the sectors;
and an engaging groove formed in the drive cam groove to extend radially adjacent to the position therein where the sectors are closed, the arrangement being such that when the displacement member is at its attracted position, the urging means causes the cam follower pin to move into the engaging groove to block the rotation of the AE gear while enabling the focus controlling mechanism to be driven in either direction and such that when the displacement member has moved to its spaced position, the cam follower pin moves out of the engaging groove to enable a rotation of the AE gear.

7. A rotational drive mechanism comprising
a drive source adapted to rotate in either direction;
a differential gearing means driven by the drive source and having a pair of output gears, one of which carrying a smaller load is driven for rotation;
a first mechanism which is designed to rotate in one direction and requires a given magnitude of drive and which is connected to one of the output gears of the differential gearing means;
a second mechanism connected to the other output gear of the differential gearing means and requiring a varying magnitude of drive during its rotation in either direction, the motion of the second mechanism being inhibited when it experiences a greater load than the first mechanism or while the first mechanism is being driven;
a displacement member normally urged away from an electromagnetic solenoid and movable between a position in which it is urged away from the solenoid and another position in which it is held attracted by the solenoid;
and an engaging portion on the first mechanism and disposed for engagement with the displacement member at a given rotational position of the first mechanism when the displacement member assumes its attracted position to block the rotation of the first mechanism, the engaging portion being disengaged from the displacement member in response to a movement of the displacement member away from the solenoid as it is deenergized.

8. A rotational drive mechanism according to claim 7 in which the first mechanism comprises an exposure control mechanism and the second mechanism comprises a focus controlling mechanism.

9. A rotational drive mechanism according to claim 7 in which the first mechanism comprises a wind-up/rewind mechanism and the second mechanism comprises a focal length changing mechanism.

10. A rotational drive mechanism for a camera comprising
a drive source adapted to rotate in either direction;
a differential gearing means driven by the drive source and having a pair of output gears, one of which experiencing a smaller load is driven for rotation;
a first mechanism connected to one of the output gears of the differential gearing means so as to be driven through a rotation of the output gear in one direction and through a given stroke;
a second mechanism connected to the other output gear of the differential gearing means, the motion of the second mechanism being inhibited when it experiences a greater load than the first mechanism or while the first mechanism is being driven;
a rotatable member disposed for rotation together with one of the output gears of the differential gearing means;
a cam groove formed in the rotatable member to extend along the direction of rotation thereof and including at least a detent groove which extends radially of the rotatable member and a guide groove continuing with the detent groove and extending over the full perimeter of the rotatable member;
detent means including a pin which fits in the cam groove and which is displaceable radially of the rotatable member;
and control means for controlling the detent means so that the pin moves radially between a position within the detent groove and another position out of the detent groove.

11. A rotational drive mechanism according to claim 10 in which the first mechanism is connected to the detent means so that it is activated in response to a radial movement of the pin which is caused by the guide groove of the cam groove.

12. A rotational drive mechanism according to claim 11 in which the first mechanism comprises a sector drive mechanism, sectors means including sectors which are opened and closed by said drive mechanism in response to a radial movement of the pin which is caused by the guide groove of the cam groove.

13. A rotational drive mechanism according to claim 12 in which the guide groove of the cam groove is formed to exhibit different degrees of inclination on the opposite side of the detent groove, thereby changing the speed of the cam groove with which the sectors are opened by selection of the direction of rotation of the drive source.

14. A rotational drive mechanism according to claim 10 in which the control means includes an electromagnet which holds the detent means attracted thereto, the pin of the detent means being held within the detent groove when attracted, the pin being controlled to move out of the detent groove into the guide groove when the attracting action is terminated.

15. A rotational drive mechanism according to claim 14 in which the guide groove includes an overcharge groove at the junction with the detent groove into which the pin of the detent means is driven to overcharge the detent means with respect to the electromagnet, whereupon the overcharge groove continues to the detent groove.

16. A rotational drive mechanism according to claim 12 in which the second mechanism comprises a lens drive mechanism which is rotated in either direction when said one output gear is locked by the detent means, thus allowing a movement of a taking lens fore and aft along the direction of an optical axis.

17. A rotational drive mechanism for a camera comprising
a bidirectional rotational drive source;
a differential gearing means driven by the drive source for selectively rotating a pair of output gears;
a first mechanism connected to one of the output gears of the differential gearing means;
a second mechanism connected to the other output gear of the differential gearing means for rotation in either direction, the motion of the second mechanism being inhibited when it experiences a greater load than the first mechanism or while the first mechanism is being driven;
a rotatable member disposed for rotation together with one of the output gears of the differential gearing;
a detent groove formed to extend radially of the rotatable member;
detent means disposed in opposing relationship with the rotatable member so as to be movable radially of the rotatable member, the detent means being operable to engage the detent groove to block rotation of the rotatable member in either direction;
guide means for guiding the detent means into engagement with the detent groove in interlocked relationship with the rotation of the rotatable member;
and control means for controlling the movement of the detent means between the engaged position and a position which is out of engagement with the detent groove.

18. A rotational drive mechanism according to claim 17 in which the guide means comprises a cam groove in the form of a closed loop extending over the full perimeter of the rotatable member, the detent groove being defined by part of the cam groove.

19. A rotational drive mechanism according to claim 18 in which the cam groove changes its distance from the center of rotation in the circumferential direction, the detent means being connected to a sector blade opening and closing mechanism, whereby it is operable to open or close sectors during the rotation of the rotatable member as it is guided by the cam groove to move radially.

20. A rotatable drive mechanism according to claim 17 in which the control means includes an electromagnet which is capable of holding the detent means attracted thereto, thereby maintaining the detent means in its engaged position.

21. A rotational drive mechanism according to claim 17 in which the detent means comprises a detent pin engageable with the detent groove, a detent lever supporting the detent pin, and a rocking lever which causes a rocking motion of the detent lever, the drive means comprises a cam mechanism interlocked with the rotatable member which drives the rocking lever to cause a displacement of the detent lever.

22. A rotational drive mechanism according to claim 21 in which the cam mechanism comprises another rotatable member which is interlocked with the first mentioned rotatable member, a drive pin on said another rotatable member, and a cam surface defined on the rocking lever for abutment by the drive pin.

23. A rotational drive mechanism for a camera comprising
    a bidirectional rotational drive source;
    a differential gearing means driven by the drive source;
    a rotatable member connected to one of the output gears of the differential gearing means and including a plurality of radially extending detent surfaces;
    a first drive mechanism connected to the rotatable member and which is designed to provide a given magnitude of drive;
    a second drive mechanism connected to the other output gear of the differential gearing means for rotation in either direction;
    detent means disposed in opposing relationship with the rotatable member and capable of moving radially of the rotatable member between a position in which it abuts against the detent surface and another position where it is out of abutment against the detent surface;
    and control means for controlling the movement of the detent means between said positions, a spacing between the plurality of detent surfaces being effective to secure a given magnitude of drive imparted to the first drive mechanism.

24. A rotational drive mechanism according to claim 23 in which two of the detent surfaces are disposed so as to be opposite to each other and spaced apart 180° along the rotatable member, and in which the first drive mechanism comprises a lens barrel drive mechanism, the lens barrel being brought to its wide angle position at a stop position which is attained by one detent surface of the rotatable member and brought to its telescope position at another stop position attained by the other detent surface.

25. A rotational drive mechanism comprising:
    a drive source capable of rotating in either of two opposing directions;
    differential gearing means having an input driven by said drive source and including a pair of output drives, said differential gearing means normally driving that output which has the smaller load coupled thereto;
    solenoid means;
    a displacement member movable between a position displaced from said solenoid means to a position in close proximity to said solenoid means where it is held attracted thereby and ultimately to an overcharged position where it is pressed against the solenoid means and is closer to said solenoid means than said attracted position;
    means coupled between said displacement member and one of said differential means outputs and having an engaging portion engageable with a portion of said displacement member, said engaging portion having a blocking portion for blocking rotation of said coupling means when the displacement member is in its attracted position, said displacement member being disengaged from the blocking portion when the displacement member is moved to the displaced position upon deenergization of the solenoid means; and
    said coupling means and the output of said differential gearing means coupled thereto being blocked from rotation when said blocking member is in said detent portion whereby said differential gearing means coupled the output of said drive source only to the remaining one of its outputs.

26. The rotational drive mechanism of claim 25 wherein said displacement means further comprises charging means coupled to said displacement means and carrying said engaging portion;
    said charging means being coupled to load means for operating said load means.

27. The rotational drive mechanism of claim 25 wherein said coupling means engaging means comprises cam means being slidably engaged by said portion of said displacement means, said cam means having said blocking portion, and a driving portion and a charging portion for respectively blocking rotation of said coupling means, moving said displacement member to its overcharged position and driving said load means when said engaging portion is respectively located in said blocking, charging and driving portions.

28. The rotational drive mechanism of the claim 27 wherein said cam means and said coupling means comprises a closed looped cam.

29. The rotational drive mechanism according to claim 28 wherein said closed looped cam is symmetrical about a predetermined imaginary center line.

30. The rotational drive mechanism according to claim 28 wherein said closed looped cam means has a substantially apple-shaped configuration.

31. A rotational drive mechanism according to claim 25 further comprising detent means for selectively blocking the first output responsive to engagement by said charging means.

32. A rotational drive mechanism according to claim 25 further comprising a rewind gear train and a wind-up gear train;
    a coupling mechanism for coupling one of the outputs of said differential gearing means to said rewind gear train when said drive source rotates in a first direction and for coupling the drive source to the wind-up gear train when the drive source rotates in the opposite direction.

33. A rotational drive mechanism according to claim 25 further comprising a lens focusing mechanism coupled to said first output and a shutter mechanism including a charging means for coupling drive to said shutter mechanism from said drive source.

* * * * *

UNITED STATES PATENT AND TRADEMARK OFFICE
CERTIFICATE OF CORRECTION

PATENT NO. : 4,958,177

DATED : September 18, 1990

INVENTOR(S) : Horoshi Akitake

It is certified that error appears in the above-identified patent and that said Letters Patent is hereby corrected as shown below:

```
On the title page:
In the Abstract, line 7, "form" should be --from--
Column 2, line 43, "flucrum" should be --fulcrum--
Column 3, line 11, "between a" should be --between an--
Column 4, line 32, "2" should be --22--
Column 4, line 38, "tee" should be --the--
Column 4, line 41, "shaft" should be --shafts--
Column 8, line 30, "411" should be --41a--
Column 13, line 28, "b" should be --be--
Column 14, line 57, "ar" should be --arm--
Column 14, line 67, before "drive" insert --rotational--
Column 24, line 14, "coupled" should be --couples--
```

Signed and Sealed this

Tenth Day of December, 1991

Attest:

HARRY F. MANBECK, JR.

*Attesting Officer*  *Commissioner of Patents and Trademarks*